United States Patent
Keidar et al.

(10) Patent No.: US 10,107,271 B2
(45) Date of Patent: Oct. 23, 2018

(54) BI-MODAL MICRO CATHODE ARC THRUSTER

(71) Applicant: THE GEORGE WASHINGTON UNIVERSITY, Washington, DC (US)

(72) Inventors: Michael Keidar, Baltimore, MD (US);
Dereck Chiu, Holmdel, NJ (US);
Taisen Zhuang, Arlington, VA (US);
George Teel, Asheville, NC (US);
Alexy Shashurin, Rockville, MD (US)

(73) Assignee: The George Washington University, Washington, DC (US)

( * ) Notice: Subject to any disclaimer, the term of this patent is extended or adjusted under 35 U.S.C. 154(b) by 683 days.

(21) Appl. No.: 14/825,356

(22) PCT Filed: Feb. 17, 2014

(86) PCT No.: PCT/US2014/016728
§ 371 (c)(1),
(2) Date: Aug. 13, 2015

(87) PCT Pub. No.: WO2014/127325
PCT Pub. Date: Aug. 21, 2014

(65) Prior Publication Data
US 2016/0273524 A1    Sep. 22, 2016

Related U.S. Application Data

(60) Provisional application No. 61/765,785, filed on Feb. 17, 2013.

(51) Int. Cl.
*F03H 1/00* (2006.01)
*B64G 1/40* (2006.01)
*B64G 1/10* (2006.01)

(52) U.S. Cl.
CPC ............. *F03H 1/0081* (2013.01); *B64G 1/10* (2013.01); *B64G 1/405* (2013.01); *B64G 1/406* (2013.01); *F03H 1/0087* (2013.01)

(58) Field of Classification Search
CPC .......... B64G 1/10; B64G 1/1085; B64G 1/40; B64G 1/405; B64G 1/26; B64G 1/404; F03H 1/0081; F03H 1/0087
See application file for complete search history.

(56) References Cited

U.S. PATENT DOCUMENTS 5,605,039 A * 2/1997 Meyer ...................... F03H 1/00
                                                      60/203.1
6,818,853 B1 * 11/2004 Schein .................. F03H 1/0012
                                                      219/121.52
(Continued)

FOREIGN PATENT DOCUMENTS

WO    WO-2017045020 A1 *    3/2017    ........... F03H 1/0006

OTHER PUBLICATIONS

International Search Report, PCT/US14/16728, dated Jun. 6, 2014, 2 pages.
(Continued)

*Primary Examiner* — Benjamin P Lee
(74) *Attorney, Agent, or Firm* — Nixon Peabody LLP

(57) ABSTRACT

A thruster for a micro-satellite is disclosed. The thruster includes a voltage source, an inductor and a resistor. A switching device is coupled to the inductor and the resistor. The thruster includes an exterior electrode composed of a first propellant, an insulator located coaxially within the exterior electrode and an interior electrode composed of a second propellant located coaxially to the insulator and the exterior electrode. An exterior housing has a proximate end and an opposite distal end with a thrust channel. The exterior housing holds the exterior electrode, the insulator and the interior electrode. The switching device is coupled to either
(Continued)

the exterior electrode or the interior electrode. The switching device is switched to pulse voltage from the inductor to create an arc between the exterior electrode and the interior electrode. Either the exterior electrode or the interior electrode may serve as a cathode to generate a plasma jet.

10 Claims, 4 Drawing Sheets

(56) References Cited

U.S. PATENT DOCUMENTS

| | | | | |
|---|---|---|---|---|
| 7,053,333 | B1 * | 5/2006 | Schein | F03H 1/0012 |
| | | | | 219/121.48 |
| 7,518,085 | B1 * | 4/2009 | Krishnan | F03H 1/0012 |
| | | | | 219/121.48 |
| 7,749,221 | B2 | 7/2010 | Rontal | |
| 7,881,803 | B2 | 2/2011 | Parramon | |
| 2003/0033797 | A1 * | 2/2003 | Spanjers | B64G 1/405 |
| | | | | 60/203.1 |
| 2007/0045248 | A1 * | 3/2007 | Schein | F03H 1/0087 |
| | | | | 219/121.52 |
| 2011/0258981 | A1 | 10/2011 | Keidar | |
| 2017/0370353 | A1 * | 12/2017 | Keidar | F03H 1/0081 |

OTHER PUBLICATIONS

Written Opinion of the International Searching Authority, PCT/US14/16728, dated Jun. 6, 2014, 7 pages.

* cited by examiner

BI-MODAL MICRO CATHODE ARC THRUSTER

PRIORITY

The present application is a national stage of PCT/US2014/176728 filed on Feb. 17, 2014, which claims priority to U.S. Provisional Application 61/765,785, filed on Feb. 17, 2013, both of which are hereby incorporated by reference in their entireties.

COPYRIGHT

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

TECHNICAL FIELD

The present invention relates generally to space propulsion systems and, more particularly, to using alternating electrodes in a micro cathode arc thruster.

BACKGROUND

Development of micro-spacecraft such as micro- and nano-satellites has expanded significantly in the last ten years with the increased miniaturization of components. The satellite user community is moving towards constellations of reprogrammable/reconfigurable autonomous systems that require numerous micro- or nano-satellites. Such satellites require a propulsion system that is sufficiently small but provides sufficient power to position the satellites in such constellations.

The design of such micro-spacecraft therefore affects the requirements of the propulsion system due to limitations related to power, mass, and fuel system complexity. The advanced propulsion systems are necessary for station keeping and orbit transfer to extend the life of the satellite, thus minimizing program launch costs and maximizing satellite lifetime value. New types of micro- and nano-thrusters are therefore needed that offer a wide range of impulse bits from nN-s to μN-s, with overall thrust efficiencies of 10-20% and very low (<1 kg) total thruster and power processing unit (PPU) mass.

A vacuum arc thruster (VAT) plasma source propulsion unit is one alternative propulsion system for micro-satellites. Such a plasma drive incorporates a cathode and anode separated by an insulator. The plasma drive includes a voltage source connected to an inductor and provides current to the inductor when a switch is enabled. The current in the inductor increases until the switch opens, which causes an arc initiation potential and an arc develops between the cathode and the anode. The plasma drive produces plasma about the external cathode-insulator interface, which is directed distally by the magnetic field. The cathode serves as the solid fuel source and propellant for the vacuum arc thruster. The thrust created by the vacuum arc thruster is dominated by pressure gradients formed by expanding plasma generated by a low voltage energy source. The efficiency and life of a vacuum arc thruster may be enhanced by a magnetic field used to direct the thrust produced. Such a vacuum arc thruster is disclosed in U.S. Patent Publication No. 2011/0258981 hereby incorporated by reference. However, even known vacuum arc thrusters are limited by the fuel contained in the cathode. Further, the vacuum arc thruster is limited in the amount of thrust generated.

Thus, there is a need for a propulsion system that has efficient use of fuel. There is a further need for a propulsion system that can vary the thrust produced based on the material of a cathode. There is a further need for a propulsion unit having electrodes that replenish as they are depleted. There is also a need to keep the propulsion system design as compact as possible for micro- or nano-satellites.

SUMMARY

According to one example, a thruster for a micro-satellite is disclosed. The thruster includes a voltage source and an inductor having a first input coupled to the voltage source and a second input. A switching device is coupled to the second input of the inductor and a resistor. A substantially tubular exterior electrode is composed of a first propellant material. A substantially tubular insulator is located coaxially within the exterior electrode. A substantially tubular interior electrode composed of a second propellant material is located coaxially to the insulator and the exterior electrode. An exterior housing has a proximate end and an opposite distal end having a thrust channel. The exterior housing holds the exterior electrode, the insulator, and the interior electrode. The switching device is coupled to either the exterior electrode or the interior electrode and the switching device is switched to pulse voltage from the inductor to create an arc between the exterior electrode and the interior electrode. Either the exterior electrode or the interior electrode serves as a cathode to generate a plasma jet through the thrust channel.

Another example is a method of providing propulsion to a micro-satellite. A first or a second electrode is selected to function as a cathode. The first and second electrodes are composed of propellant materials and are located in co-axial relation with a tubular insulator. A pulsed voltage source is provided to the selected electrode to initiate an arc between the selected electrode and an insulator to create a plasma jet. The plasma jet is directed in a thrust direction.

Another example is a micro-satellite that includes a payload and a thruster having an exterior tubular electrode, a tubular insulator, and an interior tubular electrode. The exterior electrode, insulator, and interior electrode are located coaxially of each other. A power unit is coupled to the thruster. The power unit includes an inductor and a switching device coupled to the thruster. A selection circuit has selectable connections to the exterior electrode and the interior electrode. A controller is coupled to the switching device and the selection circuit. The controller controls the selection circuit to select either the exterior electrode or the interior electrode to operate as a cathode and open the switching device to cause an electrical impulse from the power unit to be applied to the selected electrode to generate an arc between the selected electrode and the other electrode to create a plasma jet Additional aspects of the invention will be apparent to those of ordinary skill in the art in view of the detailed description of various embodiments, which is made with reference to the drawings, a brief description of which is provided below.

Figure 1A:
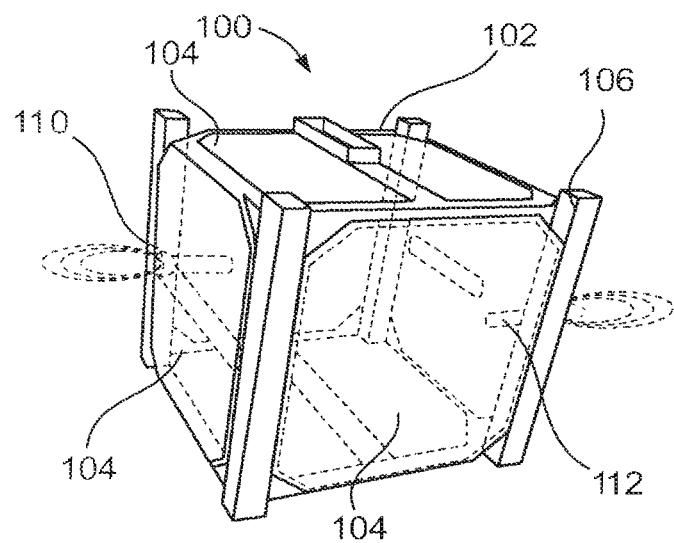
FIG. 1A is a perspective view of a cube micro-satellite incorporating bimodal-electrode micro-cathode thruster units.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims.

DETAILED DESCRIPTION

FIG. 1A is a perspective view of an example cube micro-satellite 100. The cube micro-satellite 100 includes a cubic shaped body 102 that provides an enclosure to hold a payload. Such a satellite may be used in constellations of satellites which perform different functions based on components which may be the payload. The body 102 includes side panels 104 that are attached to a framework 106. The side panels 104 may include solar cells to provide power for the satellite 100. The body 102 may hold a payload including components such as an altitude control system, camera system, transmission system, and antenna system (not shown) or other components. The micro-satellite 100 is maneuvered by two example alternating electrode micro-cathode thrusters 110 and 112 that are mounted on the framework 106. Each of the thrusters 110 and 112 incorporates a dual electrode arrangement that allows either electrode to function as a cathode to produce thrust via a plasma arc.

Figure 1B:
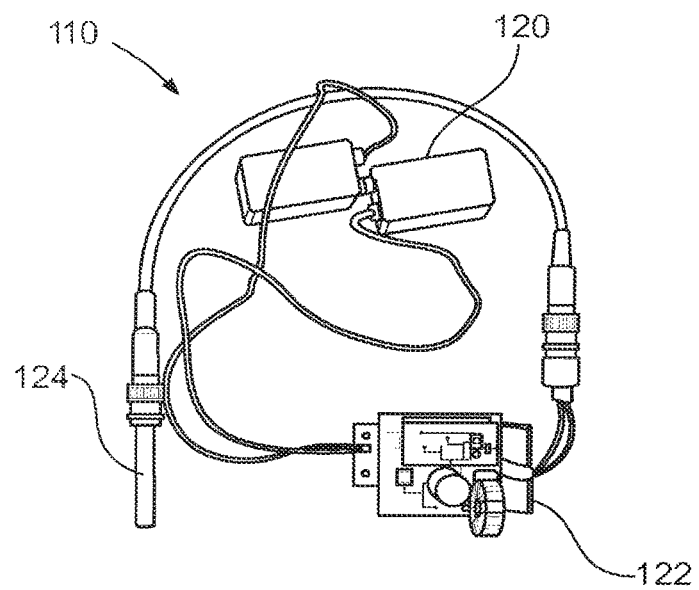
FIG. 1B is a perspective view of one of the bimodal-electrode micro-cathode thrusters in the satellite shown in FIG. 1A.

FIG. 1B is a close-up perspective view of the components of the example thruster 110 mounted on the micro-satellite 100. The thruster 110 includes a power unit 120, a control unit 122, and a thruster unit 124. The power unit 120 provides electrical power while the control unit 122 provides control signals for the thruster unit 124.

Figure 2A:
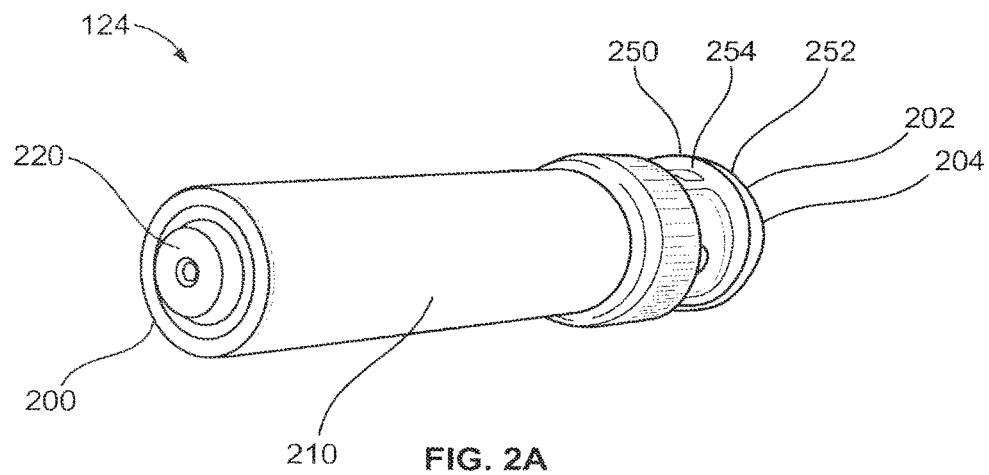
FIG. 2A is a close up perspective view of the thruster unit shown in FIG. 1B.
Figure 2B:
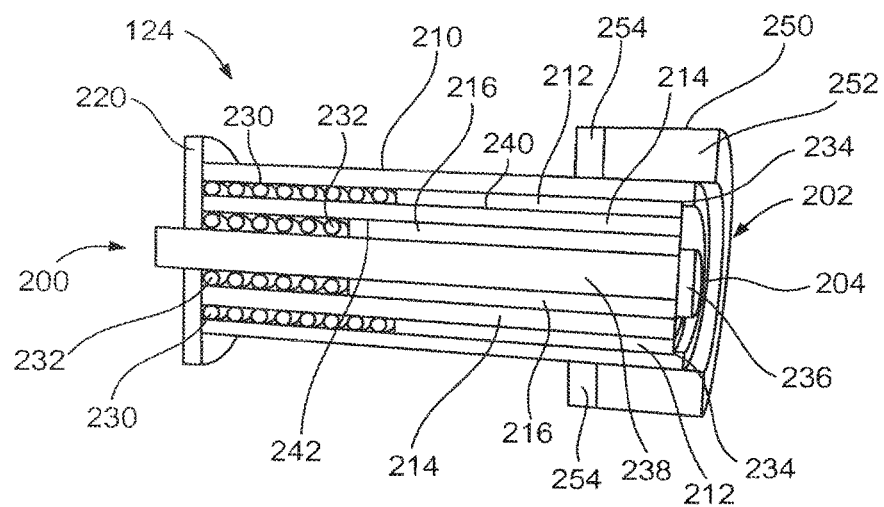
FIG. 2B is a cross-section view of the thruster unit shown in FIG. 1B.
Figure 2C:
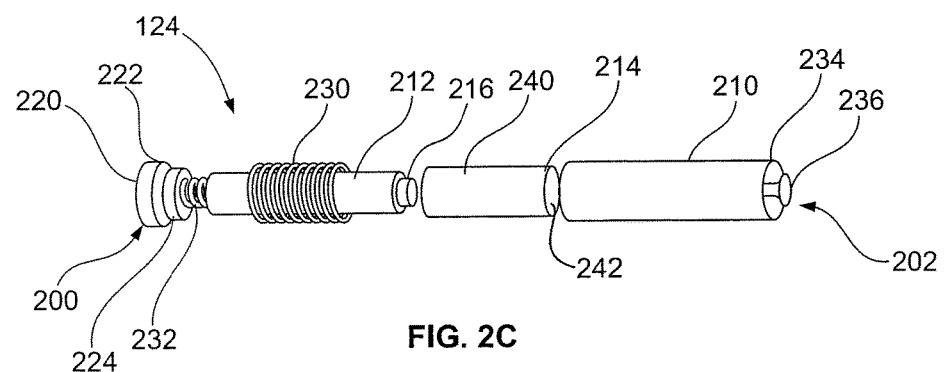
FIG. 2C is an exploded perspective view of the components of the propulsion device in FIG. 1A.

FIG. 2A is a close-up perspective view of the thruster unit 124, FIG. 2B is a cross-section view of the thruster unit 124, and FIG. 2C is an exploded perspective view of the components of the thruster unit 124 in FIG. 1B. The thruster unit 124 has a proximal end 200 and an opposite distal end 202 that includes a thrust channel 204 that emits ions in a plasma jet. The thruster unit 124 also includes a cylindrical exterior housing 210, an exterior cylindrical electrode 212, a cylindrical or tubular insulator 214, and an interior electrode 216. The interior electrode 216 is also a tubular or cylindrical shape. A cylindrical end piece 220 is attached to the proximal end 200 of the exterior housing 210. The cylindrical end piece 220 includes a circular groove 222 and a raised surface 224. An exterior biasing member 230 is seated in the groove 222 and encloses the tubular insulator 214 to force the exterior tubular cathode 212 to the distal end 202 of the thruster unit 124. An interior biasing member 232 is mounted on the end piece 220 on the raised surface 224 to contact the interior electrode 216 and force it to the distal end 202 of the thruster unit 124. The distal end 202 of the exterior housing 210 includes an annular stop 234 on which the exterior electrode 212 contacts. The distal end 202 of the exterior housing 210 also includes a ceramic screw 236 that is attached to a rod 238, which is contained in the interior electrode 216. The interior electrode contacts the ceramic screw 236. The tubular insulator 214 has an exterior surface including a thin conductive coating layer 240 and an interior surface including a thin conductive coating layer 242.

The micro-cathode thruster 110 utilizes a unique and customized design, which allows for the use of either of the two co-axial electrodes 212 and 216 that are separated by the tubular insulator 214 as a cathode fuel source for the thruster unit 124. The thruster exhaust is plasma, an ionized electrically neutral gas. As will be explained below, the thruster 110 works similar to a spark plug creating an electric arc between an anode and cathode. The arc forms a localized region of high temperature plasma or "cathode spot" at the interface between the cathode and the insulator. The cathode spot follows a circular path along the circumference of the cathode. The electric arc ablates some of the material off the cathode as high velocity plasma providing efficient, low-thrust. Each charge-discharge pulse of the electric arc creates a plasma exhaust or "impulse bit."

As the material in either of the electrodes 212 or 216 is consumed in the ionization process, the respective biasing members 230 and 232 force the electrode 212 or 216 toward the distal end 202 of the thruster unit 124. The exterior electrode 212 therefore is forced against the annular stop 234 while the interior electrode 216 is forced against the ceramic screw 236. In this example, the exterior housing 210 is an aluminum shell that holds and guides the exterior electrode 212, which is titanium in this example, while the high temperature ceramic screw 236 is used to hold the interior electrode 216, which is nickel in this example.

The micro-cathode thruster 110 utilizes a magnetically enhanced vacuum arc between either of the tubular concentrically located solid electrodes 212 and 216, which are separated by the tubular isolator 214 as shown in FIGS. 2A-2C. An annular magnet 250 is mounted around the exterior housing 210 near the distal end 202 of the thruster unit 124. The magnet 250 includes coils 252, which are turned around to generate a magnetic field through a disc shaped magnetic core 254. As will be explained below, the magnetic field generated by the magnet 250 is used to directing plasma through the thrust channel 204.

As used herein the term "tubular" refers to having the form of or consisting of a tube, such as but not limited to tubes having any cross-sectional profile e.g., a circle, square, rectangle, triangle, trapezoid, parallelogram, and the like. The exterior housing 210 is preferably configured as a cylindrical tubular housing and formed from a protective material such as, but not limited to, alumina silicate, alumina, polytetrafluoroethylene (PTFE) and the like. The annular stop 234 of exterior housing 210 caps the proximal end of the exterior housing 210. The annular stop 234 can be formed integral and unitarily with the exterior housing 210 or as a separate component attached to the exterior housing 210. The exterior housing 210 has an open discharge or open distal end 202 that is proximate the exit plane of the thruster 110. The exit plane is defined as a plane, region, or surface of the thruster unit 124 associated with the point of origin of the cathode spots or plasma plume emitted by the thruster 110.

The exterior electrode 212 is of a tubular configuration and sized to be housed within the cylindrical exterior housing 210. The exterior electrode 212 resides within the exterior housing 210 and slides along the axial length of the exterior housing 210. The exterior electrode 212 has a length less than the length of the exterior housing 210. In this example, the wall thickness of the exterior electrode 212 is about 0.1 mm to about 1.0 mm.

The exterior electrode 212 has open opposite ends, with a distal end positioned proximate the open distal end 202 of the exterior housing 210 and an opposite proximal end. The exterior electrode 212 may be formed from a conducting material such as titanium in this example. The exterior electrode 212 may also be formed from a conducting material such as carbon, aluminum, titanium, chromium, iron, yttrium, molybdenum, tantalum, tungsten, lead, or bismuth. More preferably, the conducting material is titanium, molybdenum, or tungsten.

The tubular insulator 214 is positioned between the exterior electrode 212 and the interior electrode 216 and configured to have a tubular or annular ring configuration, as shown in FIGS. 2B and 2C. The tubular insulator 214 has a length that is approximately the same as the exterior and interior electrodes 212 and 216. The tubular insulator 214 can be formed from any insulating material such as, but not limited to, alumina silicate and alumina. Preferably, the interior and exterior surfaces of the tubular insulator 214 have a non-polished, surface roughness to facilitate adhesion of conductive thin film coating layers 240 and 242.

The exterior and interior biasing members 230 and 232 may be any biasing device sufficient to provide a force to advance or slide the exterior electrode 212 and the interior electrode 216 respectively within the exterior housing 210 in the distal direction. For example, the exterior and interior biasing members 230 and 232 may be a compression spring, a constant force spring, a torsional spring, and the like. Alternatively, the biasing members 230 and 232 may be an electromechanical actuator or the like for pushing or pulling or otherwise urging the electrodes 212 and 216 within the exterior housing 210 toward the discharge or distal end 202 of the thruster 110.

The interior electrode 216 has open opposite ends, with a distal end positioned proximate the open distal end of the exterior housing 210 and the opposite proximal end. The interior electrode 216 may be formed from a conducting material such as nickel in this example, which is different from the conducting material of the exterior electrode 212. The interior electrode 216 may also be formed from other conducting materials such as carbon, aluminum, titanium, chromium, iron, yttrium, molybdenum, tantalum, tungsten, lead, or bismuth. More preferably, the conducting material is different from that of the exterior electrode 212 and is nickel, titanium, molybdenum, or tungsten.

Figure 4:
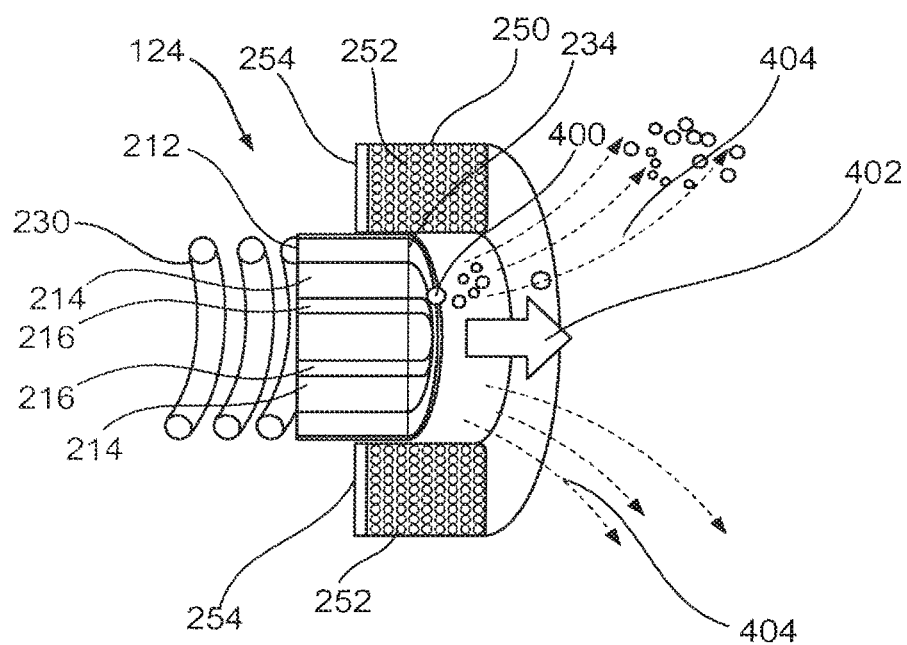
FIG. 4 is a close-up perspective view of the magnetic field and ion stream generated by the thruster in FIG. 1A.
Figure 5:
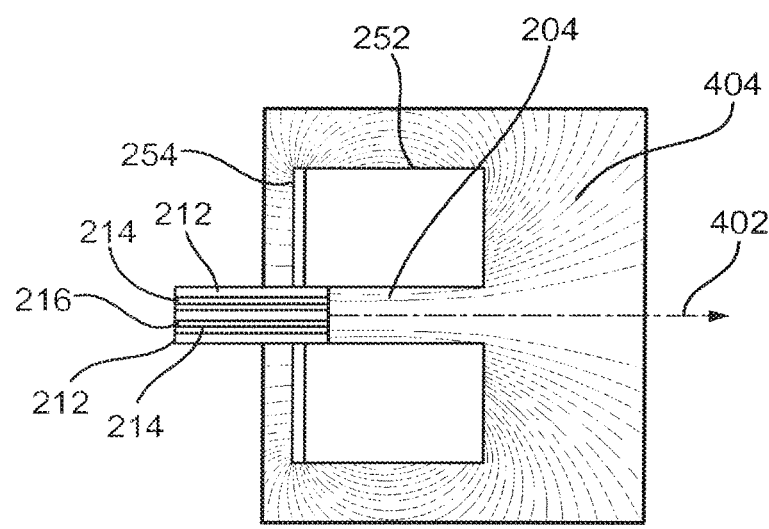
FIG. 5 is a magnetic flow diagram of the propulsion and magnetic fields from the propulsion device in FIG. 1A.

The example micro-cathode thruster 110 relies on the natural expansion of an arc plasma jet in a vacuum. As a result of the self-consistent ambi-polar electric field in the expanded plasma, ions are accelerated in a plasma jet to speeds up to $1-3 \times 10^4$ m/s. An applied magnetic field from the magnet 250 works to transform a radial cathodic jet flow into an axial flow as is shown in FIGS. 4-5. The example micro-cathode thruster 110 uses two different materials for the electrodes 212 and 216, which can alternate as cathodes to produce the arc plasma jet. The example micro-cathode thruster 110 effectively increases the utility of the propulsion by allowing thrust control based not only on the length of a micro pulse but also selecting either electrode 212 or 216 as the cathode to vary the thrust based on the electrode material.

Figure 3:
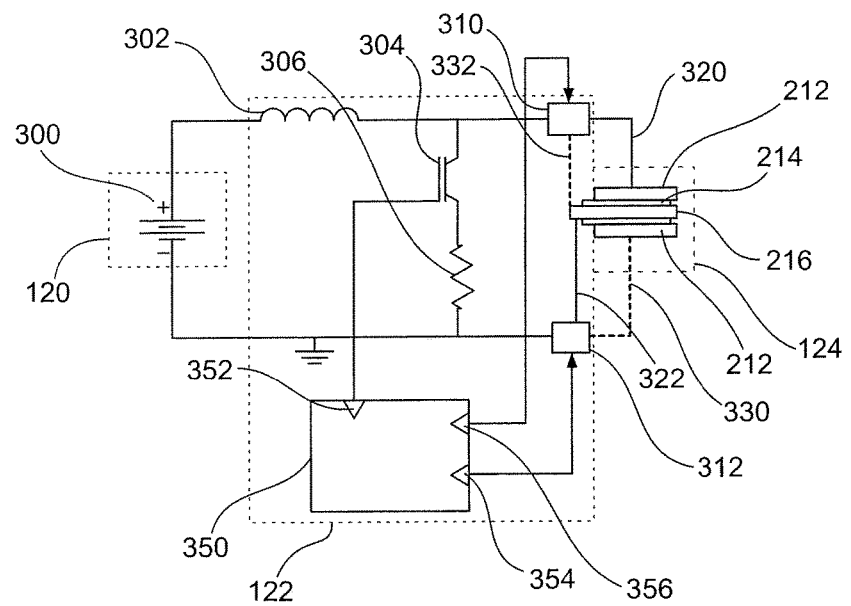
FIG. 3 is a circuit diagram of the control unit for the propulsion device in FIG. 1B.

FIG. 3 is a circuit diagram of power unit 120, control unit 122, and the thruster unit 124 of the example micro-cathode thruster 110 in FIG. 1B. The power unit 120 includes a voltage source 300, which is a battery in this example. The voltage source 300 may be recharged from solar panels on the exterior of the micro-satellite 100 in FIG. 1A. The control unit 122 includes an energy storage inductor 302, which is coupled to the voltage source 300. The energy storage inductor 302 is coupled to a switching device 304, which is coupled in series to a resistor 306 between the voltage source 300 and ground. The thruster unit 124 is coupled in parallel to the switching device 304 and the resistor 306. The circuit of the switching device 304 and the resistor 306 are coupled to variable switches 310 and 312. The variable switches 310 and 312 allow different circuit paths to connect the thruster unit 124 to the switching device 304 and the resistor 306.

The thruster unit 124 includes the tubular insulator 214, which is sandwiched by the exterior electrode 212 and the interior electrode 216. A first circuit 320 is indicated by solid line 322 where the electrode 212 is the cathode and the interior electrode 216 is the anode when the switching device 304 is closed to connect the inductor 302. A second circuit 330 is indicated by a dashed line 332 where the exterior electrode 212 is the anode and the interior electrode 216 is the cathode when the switching device 304 is closed to connect the inductor 302.

The switching device 304 is controlled by a controller 350, which has a pulse output 352 coupled to the switching device 306. Two control outputs 354 and 356 are coupled to the variable output switches 310 and 312 respectively. The controller 350 in this example is any logic device that has sufficient computational capability to generate variable pulse and control signals. The controller 350 may include processing capabilities to offer different levels of thrust to preserve the material in the electrodes 212 and 216. The controller 350 via the control outputs 354 and 356 selects either the first circuit 320 or the second circuit 330 to use either the exterior electrode 212 as the cathode fuel source or the interior electrode 216 as the cathode fuel source.

The voltage source 300 may be a battery, a solar photovoltaic cell or cells, or the like. The voltage source 300 provides current to the energy storage inductor 302 when the switching device 304 is enabled via a control signal from the controller 350. The current in the inductor 302 increases until the switching device 304 opens. Upon the switching device 304 opening, the output voltage in the thruster unit 124 increases until it achieves an arc initiation potential and an arc develops in the thruster unit 124 between the either exterior electrode 212 or the interior electrode 216 and the insulator 214.

The circuit in FIG. 3 is an inductive energy storage system. A trigger pulse is applied by the controller 350 to cause the switching device 304 to close. This accumulates energy in the inductor 302 from the voltage source 200. When the inductor coil 302 is fully charged, the switching device 304 is opened at a very fast speed (several microseconds) via the signal from the controller 350, and a surge voltage, $L*dI/dt$, is produced between the terminals of the inductor 302. This leads to a breakdown and initiation of arc discharge between the selected electrode 212 or 216, which serves as the cathode. The other electrode serves as the anode. The surge voltage breaks down the thin metal film coating layers 240 and 242 at the anode cathode insulator surface at relatively low voltage levels (≈2200 V).

Typically, the whole discharging process takes around several hundred microseconds and the current is around 60 A (for 100 to 500 µs) and conducted with voltages of 25-50 V. The efficiency of the thruster 110 may thus be ≥90%. Consequently, most of the magnetic energy stored in the inductor 302 is deposited into the plasma pulse. By varying the length of a trigger signal by the controller 350, the level of the current in the switching device 304, and thereby the energy stored in the inductor 302, may also be adjusted. This in turn changes the amount of energy transferred to the arc and the impulse bit of the individual pulse. The repetition rate of the individual pulse can be changed by varying the input signal as well.

The energy storage inductor 302 may be an iron or ferrite core inductor, an air core inductor, or a magnetic inductor or any other suitable inductor. In this example, the switching device 304 is a semiconductor insulated-gate bipolar transistor (IGBT). The switching device 304 may also be any appropriate switching device such as a MOSFET.

The conductive thin film coating layers 240 and 242 on the exterior and interior surfaces of the tubular insulator 214 as shown in FIG. 2B-2C enable discharge initiation at low applied voltages of about several hundred volts. The conductive thin film coating layers 240 and 242 may be a metal or carbon in this example. The conductive thin film coating layers 240 and 242 are preferably less than 1 micron thick and more preferably about 0.1 micron to about 1 micron thick, so that the resistance of the conductive thin coating layers 240 and 242 between the electrodes 212 and 216 is about 1 to about 40 kΩ. The high electric field produced between the electrodes 212 and 216 causes breakdown of the conductive thin film coating layers 240 and 242. This breakdown causes porosity or small gaps along the insulator 214 in the conducting area such that micro-plasmas are generated. In this example, where the electrode 212 is the cathode, these micro-plasmas expand into the surrounding space and allow current to flow directly from the electrode 212 serving as the cathode to the electrode 216 serving as the anode by forming a low resistance plasma discharge path about 0.01 ohm to about 0.1 ohm lower than an initial conductive thin film surface discharge path. Of course, the controller 350 may select interior electrode 216 to serve as the cathode, in which case the current would flow between the interior electrode 216 serving as the cathode to the exterior electrode 212 serving as the anode. Alternatively, the micro-plasmas may allow current to flow directly from the electrode 212 to the electrode 216 by forming a low resistance plasma discharge path lower than an initial conductive thin film surface discharge path.

The magnet 250 may be any magnet or device capable of producing a magnetic field, such as an electromagnet, a permanent magnet, a Halbach array magnet, or combinations thereof. The magnet 250 is preferably configured as a tubular or annular magnet having an inside diameter that is slightly larger than the outside diameter of the exterior housing 210. In this example, the magnet 250 is configured to have or produce a magnetic field of about 0.1 tesla (T) to about 0.3 T. Of course different strength magnetics to produce other magnetic field values may be used.

The magnetic field is produced through the magnetic coil 252. The magnetic core 254 is mounted concentrically outside of the exterior housing 210 of the thruster unit 124 as shown in FIG. 4. The magnetic core 254 provides a specify distribution magnetic field as shown in FIG. 4. In this example, the magnetic core 254 interacts with the coil 252 to produce the magnetic field. In this example, the coil 252 is designed to use 0.5 mm diameter copper wire winded up to 700 turns (the length and outer diameter are about 15 and 45 mm respectively). The coil 252 is designed as co-axial with the axis of the electrodes 212 and 216. The magnetic core 254 in this example is manufactured from steel 1020 and has the shape of a washer.

As shown in FIG. 4, the exterior electrode 212 has been selected as the cathode. The exterior electrode 212 is forced to the distal end of the exterior housing 210 to contact the annular stop 234 by the biasing member 230. Thus, as the material in the electrode 212 is consumed by the plasma discharge, the electrode 212 is kept in position with the distal end of the exterior housing 210. The applied electrical current creates an electric arc between the interior electrode 216 that serves as the anode and the exterior electrode 212 that serves as the cathode. As explained above, the roles of the electrodes 212 and 216 may be reversed based on the control signals from the controller 350 so the interior electrode 216 serves as the cathode. The arc forms a localized region of high temperature plasma or "cathode spot" 400 at the interface between the cathode and the insulator material of the tubular insulator 214. The cathode spot 400 follows a circular path along the circumference of the exterior electrode 212 serving as the cathode. The electric arc ablates some of the material off the electrode as a high velocity plasma jet 402 providing efficient, low-thrust. Each charge-discharge pulse of the electric arc initiated by opening the switching device 304 creates a plasma exhaust or "impulse bit." Thrust levels may be controlled by the controller 350 increasing or decreasing the number of pulses each second controlling the switching device 304.

An applied magnetic field 404 generated from the magnet 250 is shown in the arrows in FIG. 4, which guides the plasma jet 402. The magnetic field 404 created by the magnet 250 has two main functions. First, the configuration of the magnetic field keeps the arc spots at the boundary between the electrode 212 or 216 serving as the cathode and the insulator 214, i.e., at the external cathode-insulator interface. This occurs by effects of cathode spot drift towards the opening of acute angles formed by the magnetic field lines and cathode surface, the so-called "acute angle rule." Multiple cathode spots 400 are generated with a current per cathode spot of about 10 A to about 30 A depending on the material of the electrode 212 or 216 serving as the cathode. In addition, the magnetic field 404 leads to cathode spot motion in the azimuthal direction, i.e., −JxB direction, thus causing uniform erosion of the electrodes 212 or 216 from the distal face of the electrodes 212 or 216, i.e., the side facing the distal end of the exterior housing 210. The biasing members 230 or 232 push either the exterior electrode 212 or the interior electrode 216 to the distal end of the exterior housing maintaining contact with the tubular insulator 214 providing a long lifetime and stable operation of the thruster 110. The conductive thin film layers 240 or 242 deposited onto the exterior and interior surfaces of the tubular insulator 214 break down during the cathode spot formation providing the necessary conditions for forming the cathode spots 400. Second, the magnetic field transforms radial cathodic plasma jet flow into axial flow 402 as shown by FIG. 4. Thus the generated magnetic field ensures uniform and controllable cathode ablation by the cathode spot thereby leading to uniform erosion of the cathode material in either the electrode 212 or the electrode 216.

As shown in FIG. 5, the applied magnetic field 404 leads a field gradient 500 from the coil center position to the outside of the thrust channel 204. There is a divergence of magnetic field line in a Z direction, leading the magnetic strength decrease in the Z direction as indicated in FIG. 5.

The thruster 110 has the two exterior and interior cathodes 212 and 216, which enable the use of multiple propellants in the same thruster, allowing for adjustment to thrust and greater efficiency. The pulse repetition can quickly reach 50 pulses/second with average power between 0.1 Watt at 1 pulse/second; 5 Watts at 50 pulse/second with capabilities of thrusting to power ratios of up to 10 µN/W. The overall thruster mass is approximately 0.3 kg. The example thruster 110 has a low-system voltage (20-30V), lighter weight (300 g vs. 500 g), and true variable thrust operation. This results in longer thruster lifetime. The thruster 110 therefore may be applied to very small, lightweight, satellite thrusters, which serve to provide propulsion and positioning in micro-cube satellite systems. The thruster 110 is a type of low-thrust electric propulsion suitable for small satellite attitude control, precision orbit control, or low-thrust maneuvers. This thruster can be used for ultra-fine attitude control and continuous or low-thrust micro-propulsion. Such thrusters are useful for precision formation flying, accelerated de-orbit, drag-makeup and modest orbit maneuvers for small satellites. The plasma dynamics of a magnetically enhanced vacuum arc thruster may be applicable to production of advanced materials as well.

The different propellant materials in the electrodes 212 and 216 provide an additional thrust adjustable function by selecting either the electrode 212 or the electrode 216 as the cathode and therefore act as the propellant. Multiple propellants in one thruster decrease the thruster usage number on one satellite; it also decreases the satellite system weight and thereby increases the satellite payload fraction. For example, the electrodes 212 and 216 are bimodal and thus may use the same power from the power unit 120 to produce either high thrust but lower velocity using the titanium exterior electrode 212 as the cathode or low thrust and higher velocity using the nickel exterior electrode 216 as the cathode.

The inductive energy storage system in the form of the inductor coil 302 is used to drive two propellants in the respective exterior electrode 212 and interior electrode 216, which decreases the system weight. The magnet 250 is used to increase the lifetime of thruster and increase the system efficiency.

Each of these embodiments and obvious variations thereof is contemplated as falling within the spirit and scope of the claimed invention, which is set forth in the following claims.

What is claimed is:

1. A thruster for a micro-satellite, the thruster comprising:
a voltage source;
an inductor having a first input coupled to the voltage source and a second input;
a resistor;
a switching device coupled to the second input of the inductor and the resistor;
a substantially tubular exterior electrode composed of a first propellant material;
a substantially tubular insulator located coaxially within the exterior electrode;
a substantially tubular interior electrode composed of a second propellant material located coaxially to the insulator and the exterior electrode;
an exterior housing having a proximate end and an opposite distal end having a thrust channel, the exterior housing holding the exterior electrode, the insulator and the interior electrode; and
wherein the switching device is operable to be switched between being coupled in a first circuit to the exterior electrode and being coupled to a second circuit to the interior electrode, wherein the switching device is switched to pulse voltage from the inductor to create an arc between the exterior electrode and the interior electrode, and wherein the exterior electrode serves as a cathode to generate a plasma jet through the thrust channel when coupled to the switching device in the first circuit and the interior electrode serves as a cathode to generate a plasma jet through the thrust channel when coupled to the switching device in the second circuit.

2. The thruster system of claim 1, wherein the exterior electrode and the interior electrode are different materials.

3. The thruster system of claim 1, wherein the first and second propellant material are one of a group of carbon, aluminum, titanium, chromium, iron, yttrium, molybdenum, tantalum, tungsten, lead, nickel or bismuth.

4. The thruster system of claim 1, further comprising an annular magnet attached around the thrust channel producing a magnetic field to channel the plasma jet.

5. The thruster system of claim 1, further comprising a controller coupled to the switching device.

6. The thruster system of claim 5, wherein the controller controls thrust by changing the pulse output to the switching device.

7. The thruster system of claim 5, wherein the controller controls thrust by selecting the exterior electrode or interior electrode as the cathode.

8. The thruster system of claim 1, further comprising:
an exterior biasing member to force the exterior electrode to the distal end of the exterior housing; and
an interior biasing member to force the interior electrode to the distal end of the exterior housing.

9. The thruster system of claim 1, wherein the tubular insulator has interior and exterior surfaces coated with a conductive film layer, the conductive film layer in proximity to the respective exterior and interior electrodes.

10. A thruster for a micro-satellite, the thruster comprising:
a voltage source;
an inductor having a first input coupled to the voltage source and a second input;
a resistor;
a switching device coupled to the second input of the inductor and the resistor;
a substantially tubular exterior electrode composed of a first propellant material;
a substantially tubular insulator located coaxially within the exterior electrode;
a substantially tubular interior electrode composed of a second propellant material located coaxially to the insulator and the exterior electrode;
an exterior housing having a proximate end and an opposite distal end having a thrust channel, the exterior housing holding the exterior electrode, the insulator and the interior electrode;
a controller coupled to the switching device; and
wherein the switching device is coupled to either the exterior electrode or the interior electrode and the switching device is switched to pulse voltage from the inductor to create an arc between the exterior electrode and the interior electrode, wherein the exterior electrode serves as a cathode to generate a plasma jet through the thrust channel when coupled to the switching device and the interior electrode serves as a cathode to generate a plasma jet through the thrust channel when coupled to the switching device, and wherein the controller controls thrust by selecting the exterior electrode or interior electrode as the cathode.

* * * * *